Nov. 26, 1963   H. K. GRAVES   3,111,890
AUTOMATIC EXPOSURE CONTROL MECHANISM
Filed March 9, 1959

Inventor:
Howard K. Graves

United States Patent Office 3,111,890
Patented Nov. 26, 1963

3,111,890
AUTOMATIC EXPOSURE CONTROL
MECHANISM
Howard K. Graves, Morton Grove, Ill., assignor to Bell &
Howell Company, Chicago, Ill., a corporation of
Illinois
Filed Mar. 9, 1959, Ser. No. 798,014
3 Claims. (Cl. 95—64)

This invention relates to photographic cameras and more particularly relates to a means for controlling the relative size and shape of the diaphragm opening therein.

Heretofore many and varied means have been devised for controlling the size of the diaphragm opening for selectively restricting and enlarging the cross-sectional area of the light passage intermediate the light entrance into the camera and the film to be exposed. Such means generally comprise a plurality of iris members which are selectively movable to restrict or enlarge the diaphragm opening and which may be automatically or manually adjusted.

Prior devices for automatically regulating the area of the adjustable diaphragm opening have generally comprised a plurality of iris blades for defining the diaphragm opening, a photoelectric cell, and motor means drivingly associated with the blades and energized through the photoelectric cell for controllably moving the blades in direct proportion to the intensity of light impinging on the cell. Particularly in connection with cameras embodying a means for automatically adjustably moving the iris members, it has been found difficult to properly locate the iris actuating members and the automatic control mechanism therefor, due to the confinement of a great multiplicity of parts in a relatively small area.

Accordingly, it has been found advantageous to provide a diaphragm opening control mechanism which obviates the disadvantageous feature mentioned above and which comprises a mechanism wherein the controlling iris blades are spaced remotely from the automatic control mechanism therefor.

It is also advantageous, as is well known in the art, to provide a means for increasing and decreasing the area of the diaphragm opening in such a manner that the opening maintains a substantially rectangular configuration oriented relative to the exposure aperture in order to reduce vignetting of the light image on the film.

Prior attempts to provide a substantially rectangularly shaped adjustable diaphragm opening have, in general, met with difficulty when arranged to be associated with automatic exposure control mechanisms. Complex configurations have been resorted to in order to overcome this difficulty. In applicant's invention which is hereafter described with particularity, there is provided a means for adjusting the size of the diaphragm opening in a manner so as to maintain a substantially rectangular diaphragm opening under all light conditions, employing a simple actuating mechanism and a simple configuration of the portion of the iris blade forming the opening.

It will be noted that automatically operating diaphragm opening control mechanisms are generally not arranged to vary the diaphragm blade movement as an inverse square root function of the intensity of light impinging on the photoelectric cell associated therewith but, on the contrary, are generally so arranged that the diaphragm blades are moved by a substantially linear electrical motor as a direct function of the intensity of light falling on a photoelectric cell. However, since it is well known that the successive decreasing f stop openings have half the area of the preceding f stop, the diameter of the effective aperture opening must be varied inversely as the square root of the light intensity exterior of the camera; and thus the movement of diaphragm blades toward and away from the center of the diaphragm opening should be an inverse square root function of the brightness if the aperture is arranged to have a substantially constant optimum rectangular configuration. Thus, if no means is provided for adjusting the diaphragm opening control mechanism in accordance with this functional relationship, the film will be improperly exposed.

In one of the embodiments of the invention described in the specification and illustrated in the appended drawings, a pair of bell-crank levers are pivotally mounted about transversely spaced fulcrums and have cooperating iris blades formed on one end of each of the levers and non-circular gear segments formed on the opposite ends of each of the levers. A pair of cooperating gear segments are positioned in driving engagement with each of the first mentioned gear segments, which cooperating gear segments are mounted on an output power shaft of a galvanometer. The galvanometer is effective to transmit energy derived from a photoelectric cell to the rotatable power shaft to rotatably move the same in one direction and spring means are provided for rotating the shaft in an opposite direction as a function of the light impinging on the photoelectric cell.

The respective gear segments are shaped so that the angular movement of the bell-cranks provides an area of the diaphragm opening varying as an inverse function of the intensity of light impinging on the photoelectric cell, and, thus, so that the angular movement of each iris blade varies inversely as the square root of the brightness. The cooperating portions of the iris blades are also formed so that when the bell-crank levers are in an intermediate position, a rectangular diaphragm opening is formed by the overlapping iris blades so that upon movement of the cooperating iris blades out of this intermediate position to either of two opposed extreme positions the diaphragm opening will be maintained in a substantially rectangular configuration. The orientation of the rectangular diaphragm opening is arranged to be square with the film exposure in the position of smallest opening to minimize vignetting.

In a second embodiment of the invention the cooperating iris blades are similarly rotatably mounted about transversely spaced fulcrums but only one of the iris blades has a depending leg or lever formed integrally therewith which is cooperable with a gear mounted on the output power shaft of the galvanometer in order to impart pivotal movement from the helical gear head through one iris blade to the second iris blade, each of the blades is formed with an outwardly projecting link arm and these link arms are interconnected with one another by a motion translation rod so that pivotal movement of the first iris blade about its fulcrum will impart pivotal movement to the second iris blade.

Accordingly, it is a principal object of the present invention to provide an improved means for controlling the size and shape of an adjustable diaphragm opening within a photographic camera.

Yet another object of the invention is to provide a novel means for adjusting the area of the diaphragm opening in such a manner that the opening maintains a generally rectangular configuration, through the means of a relatively simple drive mechanism.

A further object of the invention is to provide a novel diaphragm opening control mechanism which will more effectively utilize the confined space within a photographic camera than has heretofore generally been possible.

A still further object of the present invention is to provide a pair of cooperating iris blades and an associated power shaft for controlling movement of the iris blades wherein means are provided for interconnecting the power shaft with the iris blades which are effective to vary the angular position of the blades as a non-linear function of the angular movement of the power shaft.

The foregoing and other objects and features of the present invention will appear from time to time as the following specification proceeds and with reference to the accompanying drawings, wherein.

Figure 1:
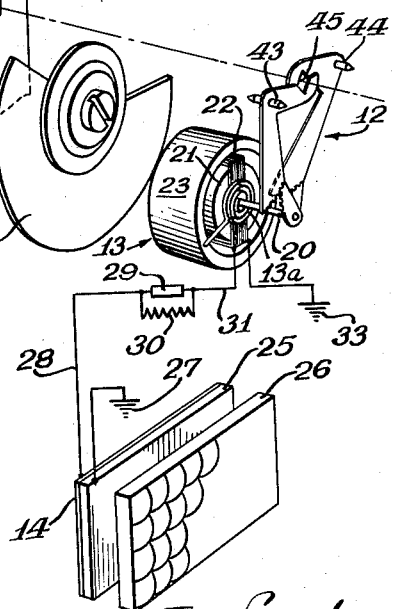
FIGURE 1 is an exploded diagrammatic view of the exposure control mechanism of the present invention together with parts of the camera related thereto and including the circuit diagram of the control.

Referring particularly to FIGURE 1 of the drawings, there is shown an exploded view of an exposure control mechanism constructed in accordance with the principles of the present invention which comprises generally a guide plate 10, a rotary shutter 11, a pair of iris members 12, a galvanometer 13, and a photoelectric cell 14.

A standard motion picture film 15 is guided against the rear face of the plate 10 which, in turn, is provided with a horizontally elongated rectangular exposure aperture 16 therein which is conformable in configuration with a standard motion picture frame, and through which successive frames of the film are exposed as the film is intermittently fed through an exposure guide. The rotary shutter 11 is disposed immediately in front of the guide plate 10 and is rotated in timed relation with the intermittent feed of the film to cover the exposure aperture 16 during the film feed intervals in a manner which is well known in the art.

The iris members 12 which form the subject of the present invention are mounted for pivotal movement in overlapping relationship with respect to one another to vary the cross-sectional area of the light passage extending between the aperture 16 and the light receiving aperture of the camera and are arranged to be pivotally driven by a rotary coil member carrying a power shaft 20 which is mounted around a stationary permanent magnet 21 of the galvanometer 13.

The galvanometer is of usual construction and comprises, in addition to the permanent magnet 21, a rotatably mounted meter coil 22 surrounding the magnet 21 and spring biased in one direction by a spring 13a, and a ring 23 of magnetic material surrounding the coil and serving to concentrate the magnetic field of the magnet. It will, of course, be understood that the galvanometer is so positioned that the pivotal axis of the coil 22 is normal to the plane of the exposure aperture 16.

The forwardly facing photoelectric cell 14 is mounted in the camera and has the usual light controlling baffle 25 disposed in front of the cell and the usual recticular lens 26 secured in front of the baffle by suitable securing means.

The circuit coil of the galvanometer is connected in circuit with the photoelectric cell 14 so that the coil is deflected from its spring-biased zero position by current derived from the photoelectric cell in proportion to the intensity of light impinging on the photoelectric cell. The photoelectric cell and galvanometer circuit comprise one terminal of the photoelectric cell connected, as designated at 27 to the metal framework of the mechanism, which framework is for convenience referred to as "ground." The other terminal of the cell is connected by a conductor 28 to thermistor 29 and to resistor 30 which is connected in shunt with the resistor 29. The other terminals of the members 29 and 30 are connected by a conductor 31 to one terminal of the meter coil 22 of the galvanometer 13, and the terminal of this coil is connected to ground as designated at 33.

The purpose of the members 29 and 30 is to compensate for the positive temperature coefficient of resistance of the photoelectric cell and the galvanometer circuit per se so that the deflection of the circuit coil 22 is not influenced by temperature variations throughout the range of temperature normally encountered in use, as from 0° to 100° F. For this purpose, the resistor 29, commercially known as a thermistor, has a negative temperature coefficient of resistance greater than the positive temperature coefficient of resistance of the photoelectric cell and galvanometer circuit per se. The resistor 30, serving as a modifying resistor, has a temperature coefficient of resistance of the photoelectric cell and galvanometer circuit per se, and the negative temperature coefficient of resistances being selected to obtain the aforesaid compensation, are fully described and claimed in copending application for United States patent of Mervin W. La Rue, Jr., and William W. Whightman, Serial No. 628,753, filed December 17, 1956, for "Exposure Control for Photographic Cameras," now Patent No. 2,996,965 and assigned to the assignee hereof.

Figure 2:
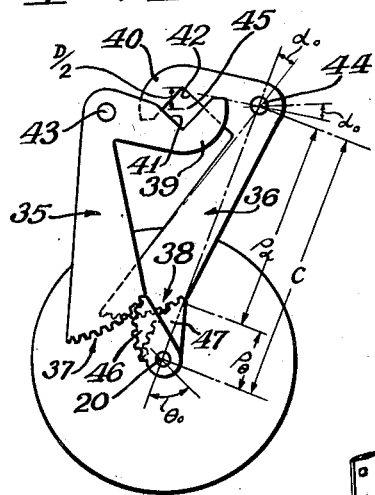
FIGURE 2 is a front elevational view of the cooperating iris members and gear head therefor and showing the iris members in a first position.
Figure 3:
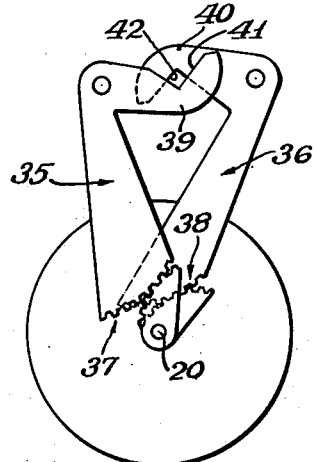
FIGURE 3 is a front elevational view of the iris members and associated gear head which is similar in nature to FIGURE 2 but which shows the iris members in a second position.

The details of the first embodiment of the diaphragm opening control mechanism of the present invention may be more fully understood from a consideration of FIGURES 2 and 3. The iris member assembly 12 is shown as including a first iris member 35 and a second iris member 36 which are in the form of bell-crank arms or levers and which have gear segments 37 and 38 at their lower ends and overlapping cooperating iris blade portions 39 and 40 at their upper ends.

The iris blades 35, 36 each have right angular cutouts 41 and 42 formed by two adjacent edges and are arranged so that when the blades 35 and 36 are in overlapping relationship with one another a diaphragm opening 45 is defined thereby through which light passes from the light receiving lenses in the camera to the film 15.

Referring also to FIGURE 1 of the drawings, it will be noted that the iris members 35, 36 are pivotally mounted about transversely displaced fulcrums on spindles 43, 44. The spindles 43, 44 have conically shaped outer end portions which are arranged to be received within suitable cooperating substantially frictionless bearings (not shown) in the photographic camera. As illustrated most clearly in FIGURES 2 and 3, the pivotal axes of the spindles 43, 44 are mounted on a transverse center line across the diaphragm opening 45 and the iris blades 39, 40 have their respective cutouts so formed that when the iris members 35, 36 are in an intermediate position and in an overlapping relationship with respect to one another, the diaphragm opening 45 is substantially rectangular in configuration. Thus, opposite rotatable movement of the members 35, 36 about their respective fulcrums will vary the area of the diaphragm opening 45 without substantially varying the rectangular configuration thereof.

Referring again more particularly to FIGURE 1 of the drawings, it will be noted that a pair of gear segments 46, 47 are mounted on the rotative member or output power shaft 20 of the galvanometer for corotational movement therewith and are so positioned with respect to the iris members 35, 36 that the gear teeth on the gear segments 46, 47 are meshed with the gear segments 37, 38 respectively, to impart rotatable movement to the iris members 35, 36 about their respective fulcrums from the output power shaft 20. It will further be understood that in order to position the gear segments 46, 47 in driving engagement with the gear segments 37, 38 the segments 46, 47 are individually disposed in spaced angular relationship with respect to one another on the rotative member 20.

It will be observed that clockwise rotatable movement of the power shaft 20 (as viewed in FIGURES 1–3) will rotate the gear segments 46, 47 through a prescribed arc but will rotate the iris members 35, 36 through a progressively smaller arc so that the area of the diaphragm opening 45 will be varied in correlation to the brightness of the light. Such movement is accomplished through the gear segments 37, 38, the gear segments 46, 47 which provide a non-linear drive to the iris members 35 and 36, in accordance with the relationships set forth below, to compensate for the fact that aperture area is non-linear relative to aperture diameter and photoelectric cells provide non-linear output.

Assuming that the diaphragm opening control mechanism illustrated in FIGURES 2 and 3 is associated with an automatic control system such as is illustrated in FIGURE 1, an increase in the intensity of light impinging on the photoelectric cell 14 will provide an increase in current output and will effect clockwise rotatable movement of the meter coil 22 and consequent clockwise rotatable movement of the power shaft 20 and the gear segments 46, 47 connected thereto as a direct function of the intensity of current output of the photoelectric cell. Such clockwise rotatable movement of the power shaft 20 will rotate the gear segments 46, 47 to a position such as is illustrated in FIGURE 3 to thereby rotatably move the iris members 35, 36 in a counterclockwise direction about their respective spaced fulcrums to decrease the effective area of the diaphragm opening 45 as a function of light impinging on the photoelectric cell.

In practice, as those skilled in the art are aware, the electrical output of a photoelectric cell of the usual selenium type is not linear relative to the brightness of the light striking it. In fact, the electrical output increases logarithmically with an increase in light-brightness. Accordingly, this non-linear relationship should be compensated in the iris drive. To achieve convenience and simplicity, compensation is obtained in the gearing between the meter shaft 20 and the iris blades 35, 36 at the same time the inverse square root relationship between aperture diameter (meter movement) and area (brightness) is compensated.

The non-linear gear segment configuration may be determined as follows: where $B$=light brightness, $I$=current output of photoelectric cell; $f$=conventional $f$ stop member of aperture; $t$=exposure time; $k$=constant; $\theta$=meter angle of deflection; ASA=film emulsion rating; $D$=effective diameter of aperture; a subscript 0 designates an initial starting point; and a subscript 1 designates any given position away from the said starting point.

Commercial photoelectric cells provide a logarithmic output, providing the following relationship:

(1) $$I - I_0 = K_1 \ln\left(\frac{B}{B_0}\right)$$

As is known in the art:

$$B = \frac{f^2}{ASA(t)} \text{ or } B = K_2 f^2$$

Therefore:

$$I - I_0 = K_1 \ln\left(\frac{f^2}{f_0^2}\right)$$

By conversion:

(2) $$I - I_0 = 2K_1 \ln\left(\frac{f}{f_0}\right) = K_3 \ln\left(\frac{f}{f_0}\right)$$

By using a conventional meter providing linear deflection angle $\theta$, with current $$\theta = K_4 I$$

Therefore, by substitution in (2):

(3) $$\theta - \theta_0 = K_5 \ln\left(\frac{f}{f_0}\right)$$

Where $$\theta_0 = 0$$

then (4) $$\theta = K_5 \ln\left(\frac{f}{f_0}\right)$$

Wherein $K_5$ may be evaluated:

$$\theta = \Delta\theta @ \ln f - \ln f_0 = 1 \text{ stop}$$

$$\ln 1.414 = k\Delta\theta$$

$$K = \frac{\ln (1.414)}{\theta}$$

Where $\Delta\theta$=increment of meter turn between $f$ stops. Since by definition $$f = \frac{K_6}{D}$$

(5) $$\theta = K_5 \ln\left(\frac{D_0}{D}\right)$$

This may be related to diaphragm aperture of the form shown in FIGURE 2 of the drawings by the following computations wherein $\alpha_0$=the angular position of the iris blade at the initial or wide open positions, $\theta_0$=the angular position of the meter shaft 20 at the initial wide open position, and $\alpha$ and $\theta$ respectively represent the angles of travel away from the wide open position toward the closed positions, and $D$=the effective diameter of the aperture as shown in FIGURE 2.

Throughout the range of iris blade movement where, as here, the radius of the iris blade is large relative to the iris diameter, the diameter of the aperture is inversely proportional to the angular deflection of the blade from an initial wide open position of deflection $\alpha_0$. Accordingly, it will be seen:

$$D = K_7(\alpha_0 - \alpha)$$

by substituting in (5):

$$\theta = K_5 \ln\left(\frac{\alpha_0}{(\alpha_0 - \alpha)}\right)$$

$$\theta = K_5 [\ln \alpha_0 - \ln (\alpha_0 - \alpha)]$$

and (6) $$\frac{d\theta}{d\alpha} = \frac{K}{\alpha_0 - \alpha}$$

The above may be related to the curves necessary for the gears using the symbols $\rho\theta$, $\rho\alpha$ and $C$ as shown in FIGURE 2.

(7) $$\rho\alpha + \rho\theta = C$$

For small angles sine $\theta$=tangent $\theta = \theta$, and, accordingly, for small increments of movement $\rho\theta d\theta = \rho\alpha d\alpha$=incremental distance moved by the contacting edge portions of the two gear segments—accordingly:

$$\frac{d\theta}{d\alpha} = \frac{\rho\alpha}{\rho\theta}$$

Thus $$\rho\alpha = \rho\theta\left(\frac{d\theta}{d\alpha}\right)$$

and $$\rho\theta = \frac{\rho\alpha}{\left(\frac{d\theta}{d\alpha}\right)}$$

by substitution in (7)

$$\rho\alpha + \frac{\rho\alpha}{\frac{d\theta}{d\alpha}} = C = \rho\alpha\left(1 + \frac{1}{\frac{d\theta}{d\alpha}}\right)$$

$$\rho\alpha = \frac{C}{1 + \left(\frac{1}{\frac{d\theta}{d\alpha}}\right)} = \frac{C\left(\frac{d\theta}{d\alpha}\right)}{\frac{d\theta}{d\alpha} + \left(\frac{d\theta}{d\alpha}\right)}$$

(8) $$\rho\alpha = \frac{C\left(\frac{d\theta}{d\alpha}\right)}{\frac{d\theta}{d\alpha} + 1}$$

and similarly $$\rho\theta\frac{d\theta}{d\alpha} + \rho\theta = C = \rho\theta\left(\frac{d\theta}{d\alpha} + 1\right)$$

(9) $$\rho\theta = \frac{C}{\left(\frac{d\theta}{d\alpha}\right) + 1}$$

substituting (6) in (8)

(10) $$\rho\alpha = \frac{C\left(\frac{K}{\alpha_0 - \alpha}\right)}{\left(\frac{K}{\alpha_0 - \alpha}\right) + 1} = \frac{C}{1 + \left(\frac{\alpha_0 - \alpha}{K}\right)} = \frac{CK}{K + (\alpha_0 - \alpha)}$$

Similarly, by substituting (6) in (9)

(11) $$\rho\theta = \frac{C}{\left(\frac{K}{\alpha_0 - \alpha}\right) + 1} = \frac{C(\alpha_0 - \alpha)}{(\alpha_0 - \alpha) + K}$$

By plotting the curvature of the two gears 36 and 47 by applying the Formulas 11 and 10 respectively, gears having segmental spiral configurations substantially as shown in the drawings are achieved whereby the area of the generally square aperture decreases inversely with increase in brightness.

Obviously, by varying to a small degree the positions of the fulcrums of the iris blades 35, 36 the relative shape of the diaphragm opening 45 can be varied to provide an essentially elongated or square diaphragm opening as desired.

Figure 4:
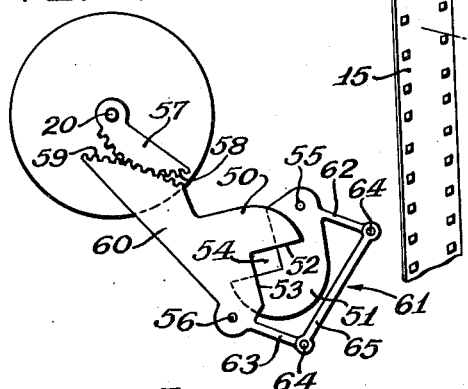
FIGURE 4 is a front elevational view of a second embodiment of the present invention showing a means for actuating a pair of cooperating iris blades through only a single bell-crank lever and associated helical gear head.
Figure 5:
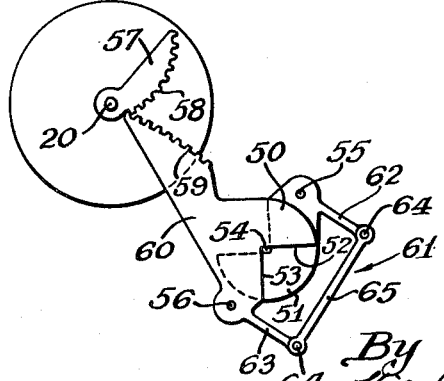
FIGURE 5 is a front elevational view of the iris blades and associated control mechanism illustrated in FIGURE 4 but showing the cooperating iris blades in a second position.

Referring more particularly to the embodiment of the invention shown in FIGURES 4 and 5, a pair of iris blades 50, 51 are shown as being disposed in overlapping relationship with respect to one another and as having angular cutouts 52, 53, respectively, which are cooperable with one another to define a substantially rectangularly shaped diaphragm opening 54. The blades 50, 51 while having a somewhat different shape from the blades 39, 40 control the area of the diaphragm opening 54 in a similar manner and are pivotally mounted about transversely displaced fulcrums on spindles 55, 56.

In this particular embodiment of the invention, however, only a single gear segment 57 is mounted on the rotary drive member 20 for corotational movement therewith and it is so disposed with respect to the iris blades 50, 51 that the gear teeth 58 on the segment 57 are arranged to drivingly engage a gear segment 59 formed on one end of a lever arm 60 which is, in turn, formed integrally with the iris blade 50. In order to conserve space between the iris blades 50, 51 and the rotary power shaft 20 only a single lever arm 60 is provided to pivotally move the iris blades 50, 51 so that the other of the two blades is therefore driven through a motion translation linkage 61 from the iris blade 50.

Outwardly projecting legs 62, 63 are formed integrally with the iris blades 50, 51 respectively, and are apertured at the outer ends thereof to receive pivot pins 64 therethrough which are, in turn, arranged to movably support an intermediate link arm 65.

In view of the foregoing, it will be observed that clockwise rotatable movement of the lever arm 60 from the position illustrated in FIGURE 4 to the position illustrated in FIGURE 5 will transmit such rotary motion to the iris blade 51 through the legs 62, 63 and the intermediate link arm 65 to thereby move the blades 50, 51 rotatably about their respective fulcrums in equal increments about the optic axis of the diaphragm opening 54 to thus vary the area thereof.

Like the diaphragm opening control mechanism illustrated in FIGURES 1-3 the mechanism illustrated in this embodiment of the invention is also provided with a non-linear gear drive between the power shaft 20 and the lever arm 60 in accordance with Formulas 10 and 11 so that the area of the diaphragm opening 54 is varied by movement of the lever arm 60 as a direct function of the brightness of the light striking the photoelectric cell 26.

It will further be understood that the lengths, shapes and points of pivotal connection of the lever arms 35, 36 or 60 may be varied within relatively wide limits as desired to provide an elongated rather than a substantially square diaphragm opening.

An important aspect of the invention is that a diaphragm opening control means has been provided which is operable to maintain a substantially rectangular diaphragm opening through all positions of the iris blades, about a fixed optic axis.

A further and particularly important feature of the present invention is that a means has been provided for varying the area of the diaphragm opening as an inverse function of the amount of light available for the picture.

It will herein be understood, of course, that these embodiments of the invention have been used for illustrative purposes only and that various modifications and variations in the present invention may be effected without departing from the spirit and scope of the novel concepts thereof.

I claim as my invention:

1. A diaphragm opening control mechanism for a photographic camera comprising a pair of iris blades pivotally mounted about spaced axes and having cooperating blade portions effective to define a diaphragm opening, a photoelectric cell, spring means, motor means having a rotative member driven in one direction by said photoelectric cell and in the opposite direction by said spring means, the relative angular position of said rotative member being determined by the relative output of said photoelectric cell, and a non-linear gear drive from said motor means to said iris blades to vary the angular position of said iris blades as a non-linear function of the angular movement of said rotative member, said non-linear gear drive including meshing segmental spiral gear segments.

2. A diaphragm opening control mechanism for a photographic camera comprising a photoelectric cell, a pair of iris members pivotally mounted at points spaced with respect to one another and intermediate each of their respective ends, one end of each of said iris members having a blade portion to define a diaphragm opening, the opposite end of each of said iris members having a spiral form gear segment, a rotatable actuating member movable as a direct function of the output of said photoelectric cell, a pair of spiral form gear segments mounted on said actuating member and positioned to mesh continuously with said gear segments of said iris members, whereby rotative movement of said actuating member drives said iris members as a logarithmic function of the angular movement of said actuating member.

3. A diaphragm opening control mechanism for a photographic camera comprising a pair of iris blades pivotally mounted about spaced axes and having cooperating blade portions effective to define a diaphragm opening, a photoelectric cell, spring means, motor means having a rotative member driven in one direction by said photoelectric cell and in the opposite direction by said spring means, the relative angular position of said rotative member being determined by the relative output of said photoelectric cell, and a non-linear gear drive from said motor means to said iris blades to vary the angular position of said iris blades as a non-linear gear drive including meshing segmental spiral gear segments in which the meshing gear segments lie on curves approximately defined by the formulas $$\rho\alpha = \frac{CK}{K+(\alpha_0-\alpha)}$$

and $$\rho\theta = \frac{C(\alpha_0-\alpha)}{(\alpha_0-\alpha)+K}$$

and said photoelectric cell produces an electrical output approximating $$I-I_0 = K_1 \ln \frac{B}{B_0}$$

wherein $\rho\alpha$ and $\rho\theta$ represent the curves necessary for the said meshing gear segments;

$C$=the distance between the pivots of said gear segments;
$K_1$=a constant;
$\alpha$=the angular position of the iris blade at the initial or wide open position;
$\alpha$=the angle of travel of the iris away from the initial or wide open position;
$I_0$=the current output of the said photocell under an initial starting condition;
$I$=the increased current output of the said photocell caused by an increase in the intensity of light impinging on the said cell;
$B_0$=the initial intensity of light impinging on said photocell; and
$B$=the increased intensity of light impinging on said photocell.

References Cited in the file of this patent

UNITED STATES PATENTS

| | | |
|---|---|---|
| 2,026,675 | Edwards | Jan. 7, 1936 |
| 2,421,499 | Guedon | June 3, 1947 |
| 2,841,064 | Bagby et al. | July 1, 1958 |

FOREIGN PATENTS

| | | |
|---|---|---|
| 216,966 | Switzerland | Jan. 16, 1942 |
| 698,573 | Great Britain | Oct. 21, 1953 |